United States Patent
Moll

(10) Patent No.: US 7,092,783 B2
(45) Date of Patent: Aug. 15, 2006

(54) PROGRAMMING AND OPERATING METHOD FOR A PROGRAMMABLE INDUSTRIAL CONTROLLER, IN PARTICULAR A CNC CONTROLLER

(75) Inventor: Ralf Moll, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 356 days.

(21) Appl. No.: 10/693,827

(22) Filed: Oct. 24, 2003

(65) Prior Publication Data

US 2004/0123124 A1    Jun. 24, 2004

(30) Foreign Application Priority Data

Oct. 24, 2002    (DE) ................ 102 49 677

(51) Int. Cl.
*G06F 19/00* (2006.01)
(52) U.S. Cl. ..................................... 700/159
(58) Field of Classification Search ............... 700/159, 700/160; 713/161, 171, 189
See application file for complete search history.

(56) References Cited

U.S. PATENT DOCUMENTS

| | | | | |
|---|---|---|---|---|
| 2001/0003527 A1* | 6/2001 | Shinohara et al. | ......... | 370/521 |
| 2002/0036791 A1* | 3/2002 | Murphy | .................... | 358/1.15 |
| 2003/0225698 A1* | 12/2003 | Stefik et al. | .................. | 705/51 |

FOREIGN PATENT DOCUMENTS

| | | |
|---|---|---|
| DE | 69221046 T2 | 3/1998 |
| DE | 198 34 863 A1 | 2/2000 |
| DE | 198 51 709 A1 | 5/2000 |
| DE | 100 08 020 A1 | 8/2000 |
| DE | 100 08 974 A1 | 9/2001 |
| DE | 101 28 829 A1 | 4/2002 |
| DE | 101 10 049 A1 | 9/2002 |
| EP | 0 337 122 A2 | 10/1989 |
| EP | 1 150 190 A2 | 10/2001 |
| WO | WO 01/52003 A1 | 7/2001 |

OTHER PUBLICATIONS

Finnila, "Combining Data Compression And Encryption", Sep. 1994, Wescon/94,IEEE Xplore, 404-409.*
Herbert Bernstein: "Sicherheit im Internet", in: Moderne Kommunikation, vol. 21/99, pp. 1767-1772, 1999.

* cited by examiner

*Primary Examiner*—Leo Picard
*Assistant Examiner*—Chad Rapp
(74) *Attorney, Agent, or Firm*—Henry M. Feiereisen

(57) ABSTRACT

A programmable industrial controller, in particular CNC controller, can be controlled by a sequence of control commands which can be interpreted and executed by the controller. A program for the controller is produced by automatically encoding the original sequence of control commands into a binary code, from which the original sequence of control commands can be reconstructed. The binary code is provided to the controller and stored in the controller. The original sequence of control commands is reconstructed in the controller, whereafter the program is executed. The controller controls a controlled device, such as a machine tool, immediately after the original control commands have been reconstructed.

24 Claims, 1 Drawing Sheet

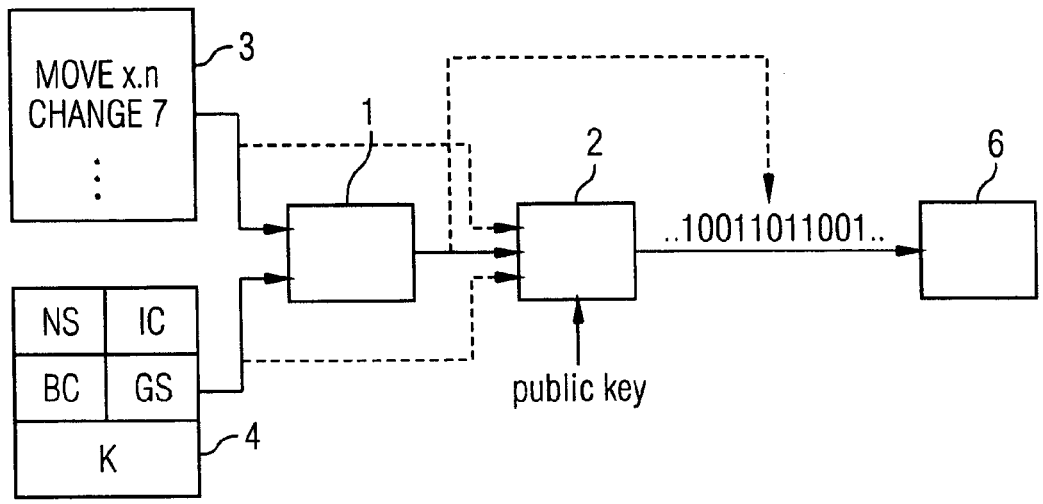
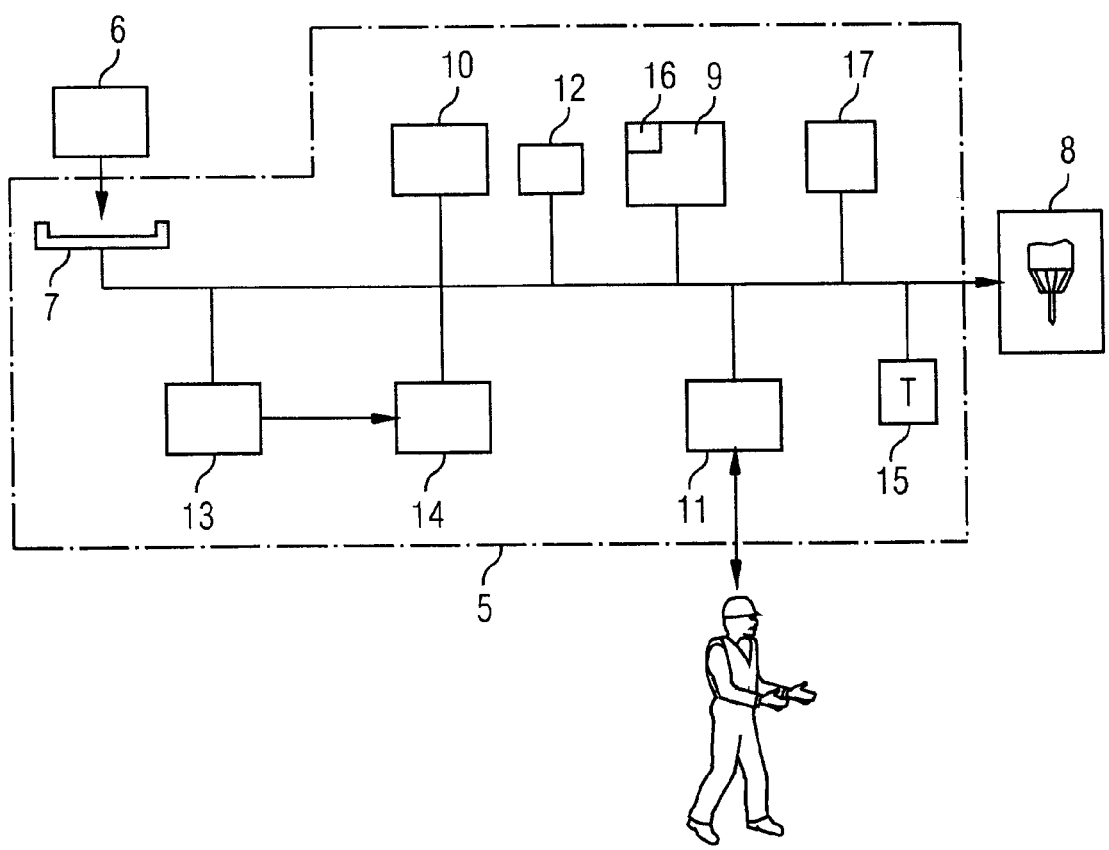

PROGRAMMING AND OPERATING METHOD FOR A PROGRAMMABLE INDUSTRIAL CONTROLLER, IN PARTICULAR A CNC CONTROLLER

CROSS-REFERENCES TO RELATED APPLICATIONS

This application claims the priority of German Patent Application, Ser. No. 102 49 677.3, filed Oct. 24, 2002, pursuant to 35 U.S.C. 119(a)–(d), the disclosure of which is incorporated herein by reference.

BACKGROUND OF THE INVENTION

The present invention relates to a programming method and an operating method for a programmable industrial controller, in particular a CNC controller. The present invention is also directed to a corresponding programmable industrial controller, which can also be a CNC controller.

In conventional methods, a sequence of control commands is generated, either directly or indirectly, for example with a CAD program, which can be interpreted and also executed by the controller. The actual sequence of control commands is in conventional applications stored in the controller and processed by the controller during the control operation.

The sequence of control commands is typically stored in the controller in the form of ASCII code. The sequence of control commands is therefore freely accessible and changeable. Since the control commands can be easily changed, usage limitations can either not be implemented at all or can be easily removed. The code is also quite lengthy and requires a significant amount of memory space, so that storing the ASCII code in the memory of a CNC controller takes a long time.

It would therefore be desirable and advantageous to provide a programming method and a corresponding operating method for a programmable industrial controller, in particular a CNC controller, which obviates prior art shortcomings and is able to specifically reduce data transfer times and memory requirements of a controller.

SUMMARY OF THE INVENTION

According to one aspect of the invention, a method for programming a programmable industrial controller, in particular a CNC controller, includes the steps of automatically coding into a binary code a sequence of control commands capable of being interpreted and executed by the controller, supplying the binary code to the controller, and reconstructing the original sequence of the control commands in the controller.

According to another aspect of the invention, a method for operating a programmable industrial controller, in particular a CNC controller, includes the steps of reconstructing a sequence of control commands from a binary code stored in the controller, with the controller capable of interpreting and executing the control commands, and controlling with the reconstructed sequence of control commands a controlled device, such as a machine tool.

According to yet another aspect of the invention, a computer program, residing on a computer-readable medium, includes instructions for causing a programmable industrial controller, in particular a CNC controller, to reconstruct a sequence of control commands from a binary code stored in the controller, with the controller capable of interpreting and executing the control commands, and to control with the reconstructed control commands a controlled device, such as a machine tool.

According to still another aspect of the invention, a programmable industrial controller, in particular CNC controller, which is capable of interpreting and executing control commands, includes means for reconstructing a sequence of control commands from a binary code stored in the controller, and means for controlling with the reconstructed sequence of control commands a controlled device, such as a machine tool.

The binary code is advantageously stored in the controller, whereby the controller reconstructs the original sequence of control commands and controls a control device, for example a machine tool, immediately after the control commands have been determined or extracted. Accordingly, not all the control commands are extracted at the beginning of the control process and are not persistently stored in the controller. Instead, the control commands reside only temporarily in the control device during the operation of the controller.

The binary code can be compressed relative to the sequence of control commands and hence uses only a small amount of memory space.

If the binary code from the sequence of control commands is encrypted, then the sequence of control commands can only be decrypted with great difficulty or cannot be decrypted at all.

Several other measures can be implemented in conjunction with the encoding.

For example, the encrypted binary code can include a usage limitation which can be used to limit the number of control commands sequences that can be used. The usage limitation is tested during the operation of the controller and can include various criteria. Examples for a usage limitation are an absolute time, (an execution date), an elapsed time since the first use, a usage duration expressed in operating hours, a number of calls to the sequence of control commands or any combination of these features.

Alternatively or in addition, the encrypted binary code can also include an individualization code which can be used to restrict the execution of the sequence of control commands to one or more specific controllers. For example, modern microprocessors include an microprocessor-specific code. This code can be queried before a sequence of control commands is executed and compared with the individualization code.

The encrypted binary code can also include a user code which can be used to limit processing of the sequence of control commands to one or more particular users, for example one specified user. For example, a password can be requested from the user and compared with the user code.

Finally, the encrypted binary code can include a comment for the sequence of control commands. The comment can include, for example, the author's name, the creation date and/or the first recipient of the binary code. In particular, storing the first recipient's name can facilitate legal action if intellectual property rights are violated or if the binary code was transmitted to a third party without authorization.

The encryption methods for creating the binary code can have many forms. Advantageously, the binary code is encrypted with a public key.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 depicts schematically a system for generating a binary code; and

FIG. 2 depicts schematically a programmable industrial controller.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a system for generating a binary code which includes a compressor 1 and a coder 2. A sequence 3 of control commands as well as additional information 4 are supplied to the compressor 1. As seen in FIG. 1, the control commands are generated in ASCII code. The compressor 1 compresses the supplied information 3, 4 and transmits the compressed version of the code to the coder 2. The coder encrypts the supplied information by using a public key. The output signal of the coder 2 represents a binary code which is made available to a programmable industrial controller 5 (see FIG. 2). For example, the binary code can stored on a memory card 6, which can later be inserted into a memory card interface 7 of the controller 5.

The controller 5 can interpret and execute the actual control commands of the sequence 3 of control commands. As mentioned above, the control commands are typically embodied in ASCII code. Conversely, the binary code into which the sequence 3 of control commands is automatically coded by the compressor 1 and the coder 2, is not an ASCII code, as discussed above.

The additional information 4 can also be compressed and encrypted. According to FIG. 1, the additional information 4 can include a usage limitation NS, an individualization code IC, a user code BC, a comment K as well as a secret key GS. The significance of the additional information NS, IC, BC, K, GS will be described in more detail below with reference to FIG. 2.

The binary code is compressed relative to the sequence of control commands as a result of the compression in compressor 1. The binary code is also encrypted compared to the sequence 3 of control commands as a result of the encryption in coder 2.

Neither compression nor encryption reduce the information content. The binary code therefore contains the full information content of the sequence 3 of control commands as well as of the additional information 4. Both the original sequence 3 of control commands as well as the additional information 4 can hence be reconstructed from the binary code.

In the embodiment of FIG. 1, compression is performed first, followed by encryption. Alternatively, the sequence 3 of control commands could also be only compressed or only encrypted, but not both. This is indicated in FIG. 1 by the dotted line. In principle, compression and encryption could also be performed in the reverse order or in a single step.

If encryption is omitted, then the additional information 4 becomes useless, with the exception of the comment K. The additional information 4 could then be transformed by a simple decompression back into ASCII code, which people can easily read and understand. On the other hand, a higher compression ratio can be obtained by using only compression (i.e. no encryption), in particular, when the compression algorithm is especially adapted to the sequence of control commands to be compressed. For example, an encoding unit can be represented by a program set.

As depicted in FIG. 2, the controller 5 controls a machine tool 8. The controller 5 is implemented herein as a CNC controller.

The binary code is stored in the controller 5, in the present example by inserting the memory card 6 into the memory card interface 7 of the controller 5.

When the controller 5 is turned on, a processor 9 initially executes a computer program 10. When executing the computer program 10, the processor 9 initially requests from a user a personal key via a man-machine interface 11. Alternatively, the processor 9 can request this key each time the controller 5 is turned on. The key can also be requested only during the initial startup, whereafter the key is stored in a persistent memory 12 of the processor 9, for example in an EEPROM memory 12.

The processor 9 transmits the entered personal key to a decoder 13. The decoder 13 then reads the binary code from the memory card 6 and decrypts the binary code using the personal key. After decryption, the sequence 3 of commands and the additional information 4 are obtained by decompression in a decompressor 14 and transmitted to the processor 9.

During further execution of the computer program 10, the processor 9 recalls, for example, from a timer 15 the absolute time and compares the absolute time with the usage limitation NS. Depending on the comparison, the processor 9 then continues the execution of the computer program 10 or terminates its operation. The number of control commands that can be used from the sequence 3 of control commands can be limited with the usage limitation NS.

During further execution of the computer program 10, the processor 9 encrypts, for example, the absolute time with the secret key GS and writes the time to the memory card 6 by accessing the memory card interface 7. In this way, for example, any manipulation of the timer 15 by the user of the controller 5 can be identified. This approach can in principle also be applied to other information.

The processor 9 then queries a processor-internal memory 16 and compares its content with the individualization code IC. Further execution of the computer program 10 is halted or continued depending on the result of this comparison. Processing of sequence 3 of control commands can thereby be restricted by the individualization code to a specific controller 5.

The memory card 6 can also include a blank code as original individualization code IC. When the processor 9 notices this, it encrypts, for example, a combination of the current time and the code stored in the processor-internal memory 16 and stores this combination in encrypted form, i.e., encrypted with the secret key GS, in the memory card 6 as a new individualization code IC. It is hence possible to supply a blank memory card 6, so that the initial use of the memory card 6 identifies a specific controller 5 permitted to execute the sequence 3 of control commands. Essentially the same approach can be applied to the user code BC.

Thereafter, still during execution of the computer program 10, the comment K is outputted via the man-machine interface 11.

After the computer program 10 has been executed to this point, the execution of the sequence 3 of control commands starts. In particular, the portion of the binary code which includes the sequence 3 of control commands is now decrypted and decompressed. The original sequence 3 of control commands is then reconstructed by the controller from the binary code. The sequence 3 of control commands, however, is not persistently stored in the controller 5. It is either not stored at all or it is stored in a volatile memory 17, preferably by storing only certain segments and by storing these segments dynamically. Immediately after the control commands have been determined, the controller 5 immediately controls the controlled device 8, in this case the machine tool 8. Consequently, the binary code is coded into the sequence 3 of control commands online only during the actual operation of the controller 5.

According to the diagram of FIG. 2, the decoder 16 and the decompressor 14 are circuit blocks. However, the circuit blocks 13, 14 can also be implemented in software as part of the computer program 10.

FIG. 2 also shows a configuration where decryption is performed first followed by decompression. In the analogy to FIG. 1, only one of these two measures may be executed. Also, the order in which the measures are executed may be reversed, and the measures may be performed as a single step.

The present invention provides a number of advantages. In particular, there is no need to change existing methods for generating the sequence 3 of control commands and for processing the sequence 3 of control commands. Only the binary code needs to be generated, based on the sequence 3 of control commands, and the sequence 3 of control commands has to be reconstructed from the binary code. The present invention significantly reduces transmission times and memory requirements in the controller 5.

It should also be mentioned that the present invention can be applied not only to a complete sequence 3 of control commands, but optionally also to segments of such sequences (subprograms). Moreover, the present invention is not limited to applications in CNC controllers 5. The programmable industrial controller 5 can also be, for example, a memory-programmable controller 5.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for programming a programmable industrial controller, comprising the steps of:
   automatically coding into a binary code an original sequence of control commands capable of being interpreted and executed by the controller;
   supplying the binary code to the controller; and
   reconstructing the original sequence of the control commands in the controller;
   wherein the binary code representing the sequence of control commands is encrypted and includes an individualization code which limits execution of the sequence of control commands to a specific controller.

2. The method of claim 1, wherein at least a segment of the binary code representing the sequence of control commands is compressed.

3. The method of claim 1, wherein the encrypted binary code includes a usage limitation that limits usage of the sequence of control commands.

4. The method of claim 1, wherein the encrypted binary code comprises a user code which restricts execution of the sequence of control commands to a particular user.

5. The method of claim 1, wherein the encrypted binary code comprises a comment for the sequence of control commands.

6. The method of claim 1, wherein the binary code is encrypted with a public key.

7. The use of a programming method of claim 1 for obtaining a binary code.

8. The method of claim 1, wherein at least a segment of the binary code representing the sequence of control commands is compressed.

9. A method for programming a programmable industrial controller, comprising the steps of:
   automatically coding into a binary code an original sequence of control commands capable of being interpreted and executed by the controller;
   supplying the binary code to the controller;
   reconstructing the original sequence of the control commands in the controller,
   controlling a controlled device with the reconstructed original sequence of the control commands; and
   deleting from the controller the reconstructed original sequence of the control commands after operation of the controller.

10. The method of claim 9, wherein at least a segment of the binary code representing the sequence of control commands is compressed.

11. The method of claim 9, wherein the encrypted binary code comprises a user code which restricts execution of the sequence of control commands to a particular user.

12. The method of claim 9, wherein the encrypted binary code comprises a comment for the sequence of control commands.

13. The method of claim 9, wherein the binary code is encrypted with a public key.

14. The method of claim 9, wherein the encrypted binary code includes a usage limitation that limits usage of the sequence of control commands.

15. A method for operating a programmable industrial controller, comprising the steps of:
   reconstructing a sequence of control commands from a binary code stored in the controller, with the controller capable of interpreting and executing the control commands;
   controlling with the reconstructed sequence of control commands a controlled device; and
   deleting from the controller the reconstructed original sequence of the control commands after operation of the controller.

16. The method of claim 15, wherein at least a segment of the binary code representing the sequence of control commands is compressed.

17. The method of claim 15, wherein in the binary code representing the sequence of control commands is encrypted.

18. The method of claim 17, wherein the encrypted binary code includes a usage limitation that limits usage of the sequence of control commands.

19. The method of claim 17, wherein the encrypted binary code includes an individualization code which limits execution of the sequence of control commands to a specific controller.

20. The method of claim 17, wherein the encrypted binary code comprises a user code which restricts execution of the sequence of control commands to a particular user.

21. The method of claim 17, wherein the encrypted binary code comprises a comment for the sequence of control commands.

22. The method of claim 17, wherein the binary code is encrypted with a public key.

23. A computer program, residing on a computer-readable medium, comprising instructions for causing a programmable industrial controller to:
reconstruct a sequence of control commands from a binary code stored in the controller, with the controller capable of interpreting and executing the control commands,
control with the reconstructed control commands a controlled device, such as a machine tool and
delete from the controller the reconstructed original sequence of the control commands after operation of the controller.

24. A programmable industrial controller capable of interpreting and executing control commands, the controller comprising:
means for reconstructing a sequence of control commands from a binary code stored in the controller;
means for controlling with the reconstructed sequence of control commands a controlled device, such as a machine tool; and
means for deleting from the controller the reconstructed original sequence of the control commands after operation of the controller.

* * * * *